Patented July 11, 1939

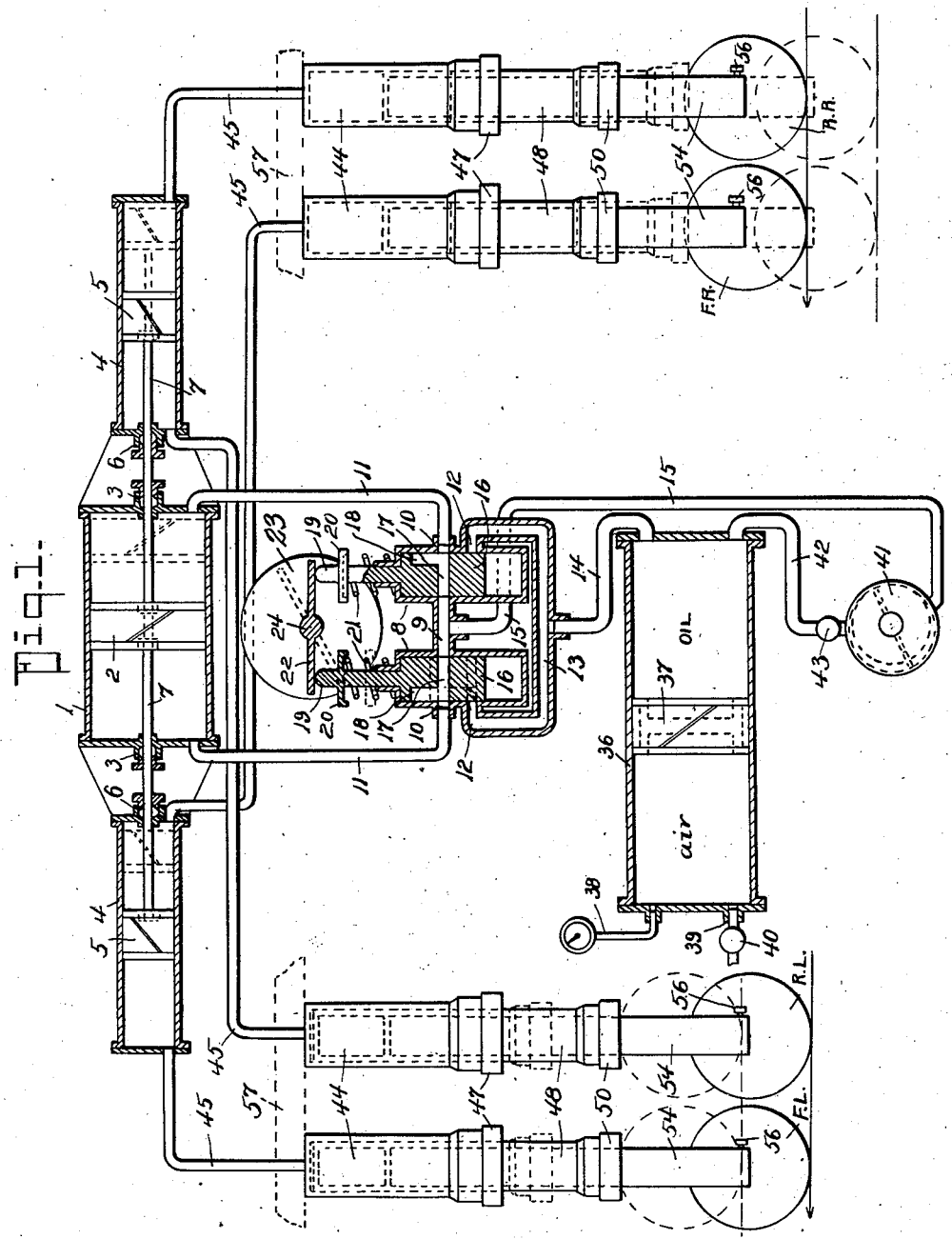

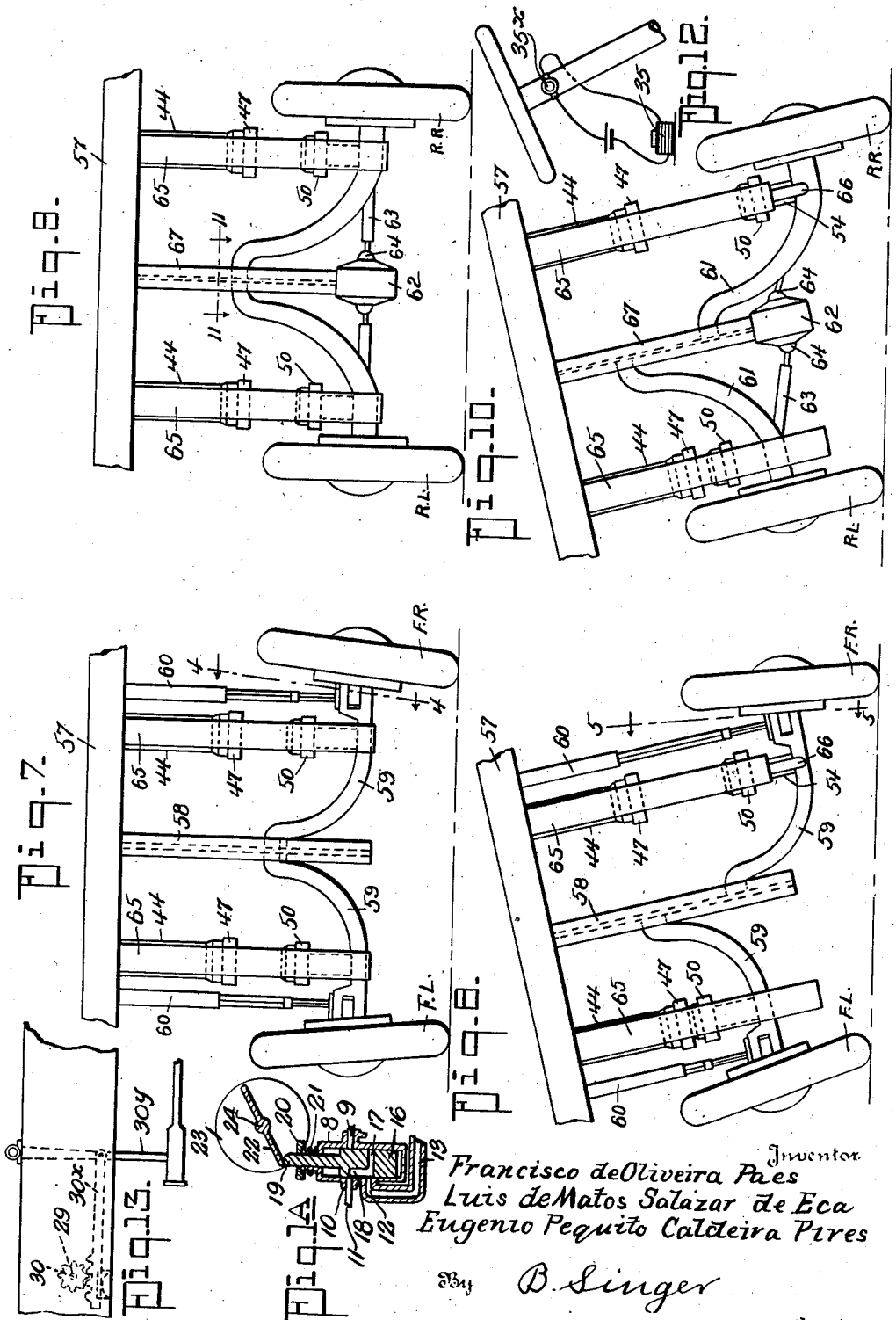

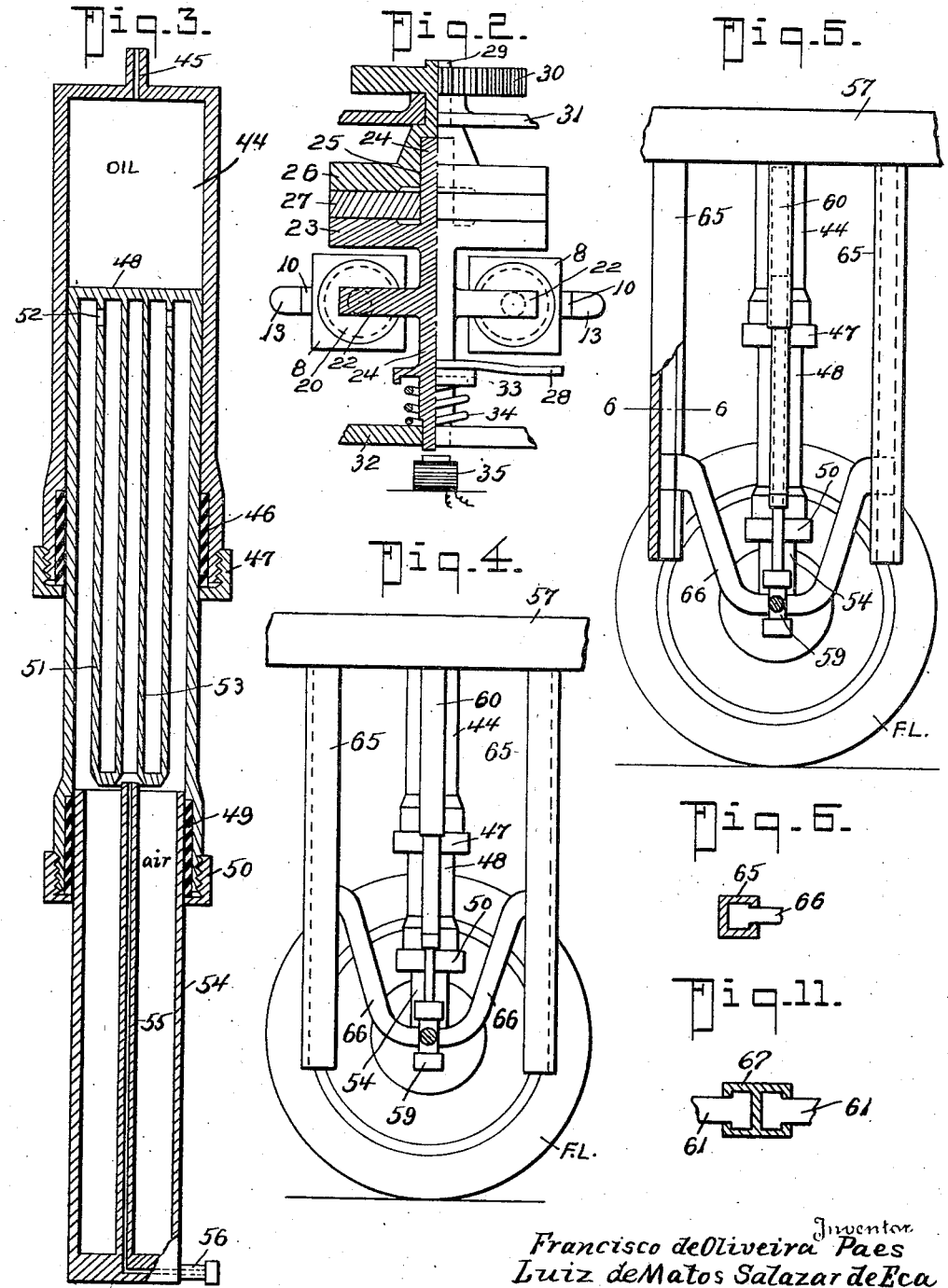

2,165,617

UNITED STATES PATENT OFFICE 2,165,617

COMBINED VEHICLE-LEVELING, TURN-BANKING, AND SHOCK-ABSORBING MECHANISM FOR MOTOR VEHICLES

Francisco de Oliveira Paes, Luiz de Matos Salazar de Eça and Eugenio Pequito Caldeira Pires, Lisbon, Portugal Application November 21, 1936, Serial No. 112,176
In Portugal August 14, 1936

7 Claims. (Cl. 280—112)

This invention relates to certain new and useful improvements in motor vehicles and it primarily has for its object to provide means whereby the vehicle when running straight ahead may maintain its body substantially level, and while it is turning the body may be tilted as in banking an aeroplane in order to prevent the vehicle from skidding or turning over on its longitudinal axis and in order that centrifugal force may not tend to throw the passengers toward the outer side of the curve, as occurs with cars that are not equipped with our invention.

Further, it is an object to provide means to keep the body of the car substantially level while driving straight ahead, regardless of unevenness in the road-bed, and regardless of whether the road is level or not.

Further, it is an object to provide a turn-bank apparatus under the control of the operator.

Again, it is an object of the invention to provide a mechanism for the purposes described which combines a hydraulic and a pneumatic shock-absorbing system for the vehicle.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:

Fig. 1 is a diagrammatic view of the essential parts constituting the invention, parts being shown in section.

Fig. 1a is a detail view hereinafter referred to.

Fig. 2 is a part plan and part sectional view of the means for operating the controlling valve device.

Fig. 3 is an enlarged vertical longitudinal section of one of the combined pneumatic-hydraulic shock-absorbing body-tilting units.

Fig. 4 is a detail section on the line 4—4 of Fig. 7 showing the position of the parts when the car is running forwardly on a level road.

Fig. 5 is a view similar to Fig. 4 showing the position of the parts when the car is turning toward the left, the view being taken on the line 5—5 of Fig. 8.

Fig. 6 is a detail section on the line 6—6 of Fig. 5.

Fig. 7 is a view of the front-wheel and axle structure looking forwardly from the driver's position in a vehicle, the car running straight ahead on a level road.

Fig. 8 is a view similar to Fig. 7 showing the position of the parts while making a left turn.

Fig. 9 is a view of the rear-wheel and axle structure looking toward the front of the car, the car traveling ahead on a level road.

Fig. 10 is a view similar to Fig. 9 showing the position of the parts while making a left turn.

Fig. 11 is a detail section on the line 11—11 of Fig. 9.

Fig. 12 is a detail view (more or less diagrammatic) showing how the operator can control the circuit of magnet 35 by means of a switch 35$^x$ located on the steering post of the vehicle.

Fig. 13 is a detail view indicating an operative connection between the steering mechanism and the gear 30 the connection being made by means of a rotatably guided rack 30$^x$ connected to the steering arm 30$^y$.

In the drawings, in which like numbers and letters of reference indicate like parts in all of the figures, 1 represents the main operating cylinder, 2 the main operating piston, and 3 the stuffing boxes through which the piston rod 7 passes out of the cylinder.

At each end of the cylinder 1 there is located a supplemental operating cylinder 4 in which is located the supplemental operating pistons 5, both pistons 5 being secured on the piston rod 7, which also passes through stuffing boxes 6 into the respective cylinders 4.

8 designates the housings of a duplex control valve, the housings having a cross-connecting duct 9 and being provided with ports 10 in transverse alignment with the duct 9. The housings 8 also have ports 12 located below the ports 10, the ports 12 of the two housings 8 being connected together by a duct 13 which communicates through a pipe or duct 14 with one end of an oil-air storage cylinder 36 in which is located a free piston 37. The ports 10 of the respective housings 8 connect respectively with the ends of the cylinder 1 through pipes or ducts 11, as best shown in Fig. 1 of the drawings.

A duct 15 connects the cross-duct 9 with the intake of the usual oil pump 41 employed on motor vehicles, the outlet side of which pump is connected through a suitable back-check valve 43 and duct 42 with the same end of the cylinder 36 to which the duct 14 is connected.

Within each housing 8 of the duplex control valve is located a valve piston 16. These pistons have cross ports 17 to effect communication between the duct 9 and the ports 10 when the valve pistons 16 are in their normal or elevated position, shown in full lines in Fig. 1. Each valve piston 16 is also provided with a longitudinal port 18 to effect communication between the adjacent ports 10 and 12 when the valve pistons are depressed, as will later more clearly appear. Each valve piston 16 is provided with a stem 19 that carries a spring cap 20 beneath which a light return spring 21 is positioned. The springs 21 serve to hold the valve pistons 16 in their elevated or normal positions when not being influenced by the valve-actuating arms 22.

Referring now more particularly to Figs. 1, 1a and 2, it will be seen that the arms 22 are carried by a rock-shaft 24 that carries a friction disk 23. The shaft 24 has one end extended through an idling friction disk 27 into a bearing recess 25 in the hub of a driving friction disk 26, there being a gear 30 secured on the stub shaft 29 for turning the disk 26 through the medium of the usual steering gear, which steering gear is provided with a pinion or worm (see Fig. 13) to mesh with the gear 30 so that, as the shaft of the steering gear is turned to steer the vehicle laterally in one direction or the other, a corresponding turning movement will be imparted to the gear 30, as will later more clearly appear.

The shaft 24 is provided with a handle 28 by which it may be manually operated by the driver when desired.

The shaft 24 also carries a spring cap 33 against which a light spring 34 presses in order to maintain the disks 26, 27 and 23 in frictional contact with each other under normal conditions. 31 and 32 designate fixed supports or bearings for the shaft 24 and stud shaft 29; these bearings 31 and 32 may be secured in any way to the frame of the vehicle so as to be relatively fixed as to position.

In order to render the mechanism shown in Fig. 2 inoperative when desired, any suitable clutch or throw-out means may be provided. For convenience of illustration only, we have shown an electro-magnet 35 to pull the shaft 24 against the tension of the spring 34 sufficiently to release the frictional contact between the disks 26, 27 and 23 when the magnet 35 is energized electrically in any suitable way by means under the control of the operator (see Fig. 12). While we have shown an electrically operated "de-clutching" means, obviously any other suitable well-known mechanism for the purpose may be employed.

38 is an air-pressure gauge and 39 is a port provided with a back-check valve 40 through which air may be pumped into the cylinder 36 to the left-hand side of the piston 37, it being understood that the chamber of cylinder 36 which is located at the right-hand side of the piston 37 contains oil. The cylinder 1 is also filled with oil, as are the ducts 11, the control valve mechanism, and ducts 14, 15 and pump 41.

Each wheel of the vehicle is connected to the chassis frame 57, not through the usual leaf-springs commonly employed in automobile construction, but through a combined pneumatic-hydraulic shock-absorber and wheel-suspension device the construction of which is best shown in Fig. 3 of the drawings, to which reference is now made. Each of these combined pneumatic-hydraulic shock-absorbers comprises an upper cylinder 44 fixed to the frame 57 of the vehicle in any suitable way so as to be rigid therewith, the cylinder 44 having a port which is connected through a suitable duct 45 with the cylinder 4, as will be more clearly explained presently.

The cylinder 44 is provided with a gland 46 and gland nut 47. An inner cylinder-piston 48 operates within the cylinder 44, the space between the head of the cylinder-piston 48 and the closed end of the cylinder 44, together with the duct 45 and the cylinder chamber 4, with which the duct communicates, being filled with oil.

The cylinder-piston 48 is also provided with a gland 49 and gland nut 50, and in this cylinder 48 a lower cylinder 54, which is fixed to the axle of the wheel with which it is associated, in any suitable way, operates.

Within the cylinder-piston 48 are two concentric cylindrical walls 51 and 53 providing between them a chamber which is closed at the bottom but open at the top through ports 52. The space within the cylinder 53 is closed at the top but open at the bottom so as to receive the tube 55 that is carried by and is rigid with the cylinder 54. The tube 55 is adapted to pass inflating air under pressure from inflation-valve 56. The valve 56 may be of any well-known type, as—for instance—that used in the valve-stem of a pneumatic tire, the idea being that by attaching a pump to the valve 56 air may be pumped into the cylinder-piston 48 and the cylinder 54 so that the body of the vehicle may be supported on the axles by the pneumatic cushion thus formed.

Fig. 3 shows the position of the parts under no load; when they are under load, however, the cylinder 54 will be telescoped somewhat further into the cylinder-piston 48 and the tube 55 will be projected into the cylinder 53. This will place the oil in the chamber above the cylinder-piston 48 under pressure.

The chassis frame has been indicated by the numeral 57.

Referring now particularly to Figs. 4, 5, 7 and 8, the means for mounting the front wheels of the vehicle on the chassis will be understood. In these figures 58 designates a central, fixed axle-guide which is also rigidly mounted on the chassis frame 57 and in grooves of which the adjacent ends of the half-axles 59 are connected with the frame 57 by means of vertical telescopic braces 60, as will be clear by reference to the drawings. The half-axles 59 are provided with inverted U-shaped braces 66 the ends of which are guided in vertical guides 65 that are also rigidly carried by the frame 57, see Figs. 4 and 5, so that the members 66 have vertical movement in the guides 65.

The rear axle arrangement is shown in Figs. 9 and 10, by reference to which it will be seen that the half-axle sections 61 have their adjacent ends vertically slidable in a fixed guide 67 similar to the guide 58. The guide 67 is also rigidly connected to the chassis frame 57 and to the differential housing 62. Telescopic drive axles 63 connect the differential gearing through universal joints 64 with the rear driving wheels R. L. and R. R., respectively.

The wheels of the vehicle are designated by F. L. for the front left-hand wheel and F. R. for the front right-hand wheel, by R. L. for the rear left-hand wheel, and by R. R. for the rear right-hand wheel.

*Operation*

The manner of operation is as follows:

Assume the vehicle to be running on a level road straight ahead. At this time the parts will be in the position indicated in full lines in Figs. 1, 7 and 9. Now assume that the vehicle is being turned to the left to round a curve. As the steering wheel of the vehicle is turned and its motion is imparted to the gear 30, as before described, assume that the direction of movement imparted to the shaft 24 is such as to depress the left-hand arm 22 in Fig. 1 (see dotted lines), thereby forcing the left-hand valve piston 16 downwardly to cut off communication between the ports 10 and 9.

We assume, of course, that the pump 41 is in operation and oil under pressure is in the cylinder 36. As soon as the ports 10 and 12 of the left-hand valve housing 8 are brought into communication by means of port 18, oil will flow from cylinder 36, through ducts 14 and 13 and left-hand duct 11, to the left-hand side of the cylinder 1, thereby impelling piston 2 from left to right in Fig. 1. At the same time the oil in advance of the piston 2 will pass through right-hand duct 11, and ports 10 and 17 of the right-hand valve element, to duct 9 and from thence through duct 15 to pump 41, returning by pump 41 and duct 42 to cylinder 36.

As piston 2 is moved from the central position to the right-hand side it will at the same time carry pistons 5 to the right (see dotted lines, Fig. 1), thereby permitting oil to flow from the left-hand fixed cylinders 44 into the respective cylinders 4 and at the same time forcing oil from the cylinders 4 into the right-hand cylinders 44. This causes the chassis frame 57 to tilt on its longitudinal axis, lowering the left-hand side and elevating the right-hand side, thereby causing the parts to assume the position of Figs. 8 and 10 and banking the body of the vehicle accordingly. As soon as the turn shall have been completed and the steering wheel brought back to the mid-position, the valve-piston 16 will again assume the position shown in full lines in Fig. 1. This causes the two ends of the cylinder 1 to communicate with each other through ducts 11, ports 10, 17 and duct 9, thereby enabling the body to right itself due to an equalization of the oil pressures in the cylinders 44 which restores the pistons 2 and 5 to their mid or balanced positions.

If, in making a turn, the gear 30 travels more than the distance required to move the arm 22 to its valve-opening position, the disk 26, 27, 23 will slip on each other. In this case on the return to the straight-way position the tendency may be to overrun the mid-position of the shaft 24. If this occurs the operator, by energizing the magnet 35, will release the frictional engagement between the disks 26, 27, 23, and thus permit the springs 21 to equalize the pressure on the arms 22 and restore the shaft 24 to its normal position of Fig. 1.

If the vehicle is now traveling on a straight-way banked road, for example, so that under ordinary conditions the body of the vehicle would not be level, it may be made level by manually operating the shaft 24 by the handle 28 to depress one or the other of the valves 16, as may be necessary to effect an operation hydraulically of the cylinder pistons 48. Assume, for example, that the road is banked so that the right-hand side of the vehicle is lower than the left-hand side. In that event the operator will rock the lever 28 to bring the parts to the position shown in dotted lines in Fig. 1, thereby raising the chassis frame 57 on the right and lowering it on the left side until the body of the vehicle assumes a level position. As soon as the road itself is level, the handle 28 may be manipulated to return the shaft 24 to its normal position, or by simply energizing the magnet 35 the parts may be automatically returned to their normal positions. While the oil pump 41 is operating, oil will always be under pressure in the cylinder 36, the pressure being maintained by the air under pressure in the said cylinder, as indicated on any suitable air-pressure gauge 38.

From the foregoing description, taken in connection with the accompanying drawings, it is thought that the construction, operation and advantages of the invention will be clear to those who are skilled in the art to which it appertains.

What we claim is:

1. The combination with a motor road vehicle having a body frame, wheels and axles and a steering mechanism, of a turn-banking apparatus and means to operate the same by action of said steering mechanism, said turn-banking apparatus including a hydraulic cylinder and piston cooperating with each wheel, hydraulic main and auxiliary operating cylinders and pistons, means cooperatively connecting said auxiliary cylinders with said hydraulic cylinders for the wheels, a hydraulic control valve apparatus operatively connected with said hydraulic main operating cylinder and with a source of liquid under pressure, and a valve operating connection between said steering mechanism and said control valve.

2. In road vehicles, a body frame, front and rear independently mounted running wheels for carrying said frame, a hydraulic cylinder and piston connecting each wheel with the frame, a main and two auxiliary operating hydraulic cylinders fixed with respect to one another and pistons therefor, a common piston rod connection between the main and auxiliary piston so they will move as one, the hydraulic cylinders for the wheels on one side of the vehicle being connected respectively to one corresponding end of each of said auxiliary cylinders while the other ends of the auxiliary cylinders are correspondingly connected to the hydraulic cylinders for the wheels on the other side of the vehicle, and means cooperating with the main operating cylinder and its piston to move the connected pistons in one direction or the other thereby to cause the vehicle frame to tilt on a longitudinal axis to one side or the other as the case may be.

3. In road vehicles, a body frame, front and rear independently mounted running wheels for carrying said frame, a hydraulic cylinder and piston connecting each wheel with the frame, a main and two auxiliary operating hydraulic cylinders fixed with respect to one another and pistons therefor, a common piston rod connection between the main and auxiliary piston so they will move as one, the hydraulic cylinders for the wheels on one side of the vehicle being connected respectively to one corresponding end of each of said auxiliary cylinders while the other ends of the auxiliary cylinders are correspondingly connected to the hydraulic cylinders for the wheels on the other side of the vehicle, a storage cylinder having a free piston dividing it into two compartments, means to retain compressed air in one compartment, and means to pump liquid into the other compartment and means including a control valve device for taking liquid from said other compartment and delivering it to one side or the other of said main operating cylinder and delivering liquid from the other side of the same back to said pumping means.

4. In a road vehicle having a frame and front and rear wheels; a combined pneumatic shock-absorber and hydraulically actuated unit connecting each wheel with the frame resiliently and separately from the others, and hydraulic mechanism connected with each of said combined units for oscillating the frame on a longitudinal axis.

5. In a road vehicle having a frame, front and rear pairs of wheels and a steering mechanism; a combined pneumatic shock-absorber and hydraulically actuated unit connecting each wheel with the frame resiliently and separately from the others, hydraulic mechanism connected with each of said combined units for oscillating the frame on a longitudinal axis, and means to control said hydraulic mechanism by the steering mechanism of the vehicle to bank the frame on turns.

6. In a motor vehicle, a frame, front and rear half axle structures, fixed guides for the same whereby each wheel has up-and-down movement independently of the others, combined cylinder and piston pneumatic suspensions connecting each wheel half-axle structure with the frame, and hydraulic means cooperating with each of said suspensions for tilting the frame laterally with respect to the wheels to bank the frame on turns.

7. The combination with a motor road vehicle having a body frame, wheels and axles and a steering mechanism, of a turn-banking apparatus and means to operate the same by action of said steering mechanism, said turn-banking apparatus including a hydraulic cylinder and piston co-operating with each wheel, hydraulic main and auxiliary operating cylinders and pistons, means cooperatively connecting said auxiliary cylinders with said hydraulic cylinders for the wheels, a hydraulic control valve apparatus operatively connected with said hydraulic main operating cylinder and with a source of liquid under pressure, and a valve operating connection between said steering mechanism and said control valve, said valve operating connection including means under control of the operator for rendering said connection operative or inoperative at will.

FRANCISCO DE OLIVEIRA PAES.
LUIZ DE MATOS SALAZAR DE EÇA.
EUGENIO PEQUITO CALDEIRA PIRES.